United States Patent [19]

Cuscurida et al.

[11] Patent Number: 5,723,565
[45] Date of Patent: Mar. 3, 1998

[54] EPOXY CURING AGENTS

[75] Inventors: Michael Cuscurida, Austin; Kathy Beth Sellstrom, Pflugerville, both of Tex.

[73] Assignee: Huntsman Petrochemical Corporation, Austin, Tex.

[21] Appl. No.: 44,791

[22] Filed: Apr. 12, 1993

[51] Int. Cl.[6] .................................................. C08G 59/62
[52] U.S. Cl. ........................ 528/111; 528/110; 528/370
[58] Field of Search ................................ 528/111, 370, 528/110

[56] References Cited

U.S. PATENT DOCUMENTS 4,488,982  12/1984  Cuscurdia et al. ............... 252/174.21
5,221,726   6/1993  Dabi et al. ........................... 528/111

Primary Examiner—Frederick Krass
Attorney, Agent, or Firm—Russell R. Stolle; Ron D. Brown; Richard A. Morgan

[57] ABSTRACT

An epoxy resin composition comprises the cured reaction product of an epoxy base resin and a curing agent mixture. The curing agent mixture comprises an amino curative and a polyoxyalkylene polycarbonate. Liquid epoxy base resins cured with polyoxyalkyleneamines in the presence of polyoxyalkylene polycarbonates were harder and displayed improved tensile modulus, flexural strength and flexural modulus.

5 Claims, No Drawings

EPOXY CURING AGENTS

BACKGROUND OF THE INVENTION

1. Field Of The Invention

The invention is the cured reaction product of an epoxy resin and a curing agent. The curing agent is a mixture of an amino curative and a polyoxyalkylene polycarbonate.

2. Related Publications In The Art

Epoxy resins constitute a broad class of polymeric materials having a wide range of physical properties. The resins are characterized by epoxide groups, which are cured by reaction with catalysts or curing agents which provide cured epoxy resin compositions with certain desirable properties.

U.S. Pat. No. 3,236,895 to J. M. Lee et al. teaches a series of polyoxyalkylenepolyamines. These diprimary amines are useful for curing epoxy resins.

U.S. Pat. No. 4,488,982 to M. Cuscurida et al. teaches low foaming nonionic polyether polycarbonate surfactants and functional fluids. The surfactants and functional fluids are prepared by reacting a monofunctional initiator with an alkylene carbonate or with an alkylene oxide and carbon dioxide to form polyether polycarbonate materials.

U.S. Pat. No. 4,222,954 to M. Cuscurida et al. teaches iodophore compounds prepared by reacting a polyether polycarbonate and an iodine-supplying compound. The polyether polycarbonate is prepared by reacting a monohydroxy organic initiator with alkylene oxide and carbon dioxide.

SUMMARY OF THE INVENTION

The invention is an epoxy resin composition comprising the cured reaction product of an epoxy resin and a curing agent. The curing agent is the mixture of an amino curative and a polyoxyalkylene polycarbonate.

The polyoxyalkylene polycarbonate is prepared by reacting a monohydric or dihydric initiator with alkylene oxide and carbon dioxide.

The monohydric or dihydric initiator comprises an alcohol, a glycol, an alkylphenol, a monocarboxylic acid, a dicarboxylic acid and/or alkylene oxide adducts thereof. The initiator is reacted with alkylene oxide having 2 to 5 carbon atoms and carbon dioxide in the ratio of 1 to 10 moles of alkylene oxide per mole of carbon dioxide to add an oxyalkylene carbonyl chain. In the alternative the initiator is reacted with an alkylene carbonate having from 2 to 6 carbon atoms to add the oxyalkylene carbonyl chain. In either case there is present an average of from 1 to 30 carbonyl groups in the oxyalkylene carbonyl chain per mole of initiator.

DESCRIPTION OF THE PREFERRED EMBODIMENTS

According to the invention an epoxy base resin is admixed with a curing amount of a curing agent comprising a mixture of an amino curative and a polyoxyalkylene polycarbonate.

The preferred epoxy base resin is a vicinal polyepoxide containing compound. Generally the vicinal polyepoxide containing compounds which are amine cured are organic materials having an average of at least 1.8 reactive 1,2-epoxy groups per molecule. These polyepoxide materials can be monomeric or polymeric, saturated or unsaturated, aliphatic, cycloaliphatic, aromatic or heterocyclic, and may be substituted if desired with other substituents besides the epoxy groups, e.g., hydroxyl groups, ether radicals, aromatic halogen atoms and the like. These vicinal polyepoxide containing compounds typically are of an epoxy equivalent weight (EEW) of 150 to 250. Preferably the base resin, which has an epoxide equivalent weight of from 175 to 195, is derived from condensing epichlorohydrin with 2,2-bis(p-hydroxyphenyl propane) to form 2,2-bis[(p-2.3 epoxy propoxy)phenyl] propane, a derivative of bisphenol A.

Preferred polyepoxides are those of glycidyl ethers prepared by epoxidizing the corresponding allyl ethers or reacting, by known procedures, a molar excess of epichlorohydrin and an aromatic polyhydroxy compound, i.e., isopropylidene bisphenol, novolac, resorcinol, derivatives or aromatic amines, etc. The epoxy derivatives of methylene or isopropylidene bisphenols are especially preferred.

A widely used class of polyepoxides which are useful according to the present invention includes the resinous epoxy polyethers obtained by reacting an epihalohydrin, such as epichlorohydrin, and the like, with either a polyhydric phenol or a polyhydric alcohol. Typically the epoxy resins have an average of at least 1.8 reactive, 1,2-epoxy groups per molecule. An illustrative, but by no means exhaustive, listing of suitable dihydric phenols includes 4,4'-isopropylidene bisphenol, 2,4'-dihydroxydiphenylethylmethane, 3,3'-dihydroxydiphenyldiethylmethane, 3,4'-dihydroxydiphenylmethylpropylmethane, 2,3'-dihydroxydiphenylethylphenylmethane, 4,4'-dihydroxydiphenylpropylphenylmethane, 4,4'-dihydroxydiphenylbutylphenylmethane, 2,2'-dihydroxydiphenylditolylmethane, 4,4'-dihydroxydiphenyltolylmethylmethane and the like. Other polyhydric phenols which may also be co-reacted with an epihalohydrin to provide these epoxy polyethers are such compounds as resorcinol, hydroquinone, substituted hydroquinones, e.g., methylhydroquinone, and the like.

Among the polyhydric alcohols which can be co-reacted with an epihalohydrin to provide these resinous epoxy polyethers are such compounds as ethylene glycols, propylene glycols, butylene glycols, pentane diols, bis-(4-hydroxycyclohexyl)dimethylmethane, 1,4-dimethylolbenzene, glycerol, 1,2,6-hexanetriol, trimethylolpropane, mannitol, sorbitol, erythritol, pentaerythritol, their dimers, trimers and higher polymers, e.g., polyethylene glycols, polypropylene glycols, triglycerol, dipentaerythritol and the like, polyallyl alcohol, polyhydric thioethers, such as 2,2'-, 3,3'-tetrahydroxydipropylsulfide and the like, mercapto alcohols such as monothioglycerol, dithioglycerol and the like, polyhydric alcohol partial esters, such as monostearin, pentaerythritol monoacetate and the like, and halogenated polyhydric alcohols such as the monochlorohydrins of glycerol, sorbitol, pentaerythritol and the like.

Another class of polymeric polyepoxides which can be amine cured and are in accordance with the present invention includes the epoxy novolac resins obtained by reacting, preferably in the presence of a basic catalyst, e.g., sodium or potassium hydroxide, an epihalohydrin, such as epichlorohydrin, with the resinous condensate of an aldehyde, e.g., formaldehyde, and either a monohydric phenol, e.g., phenol itself, or a polyhydric phenol. Further details concerning the nature and preparation of these epoxy novolac resins can be obtained in Lee, H. and Neville, K., *Handbook of Epoxy Resins*, McGraw Hill Book Co., New York, 1967.

It will be appreciated by those skilled in the art that the epoxy base resins which are useful according to the practice of the present invention are not limited to those in the above described epoxy base resins, but that these epoxy base resins are to be considered merely as being representative of epoxy base resins as a whole.

The amine curing agents which can be utilized in accordance with the instant invention are generally any of those amine curing agents which are well-known to be useful for the curing of vicinal epoxides. Generally, those curing agents which have at least three reactive amino hydrogens are useful.

Exemplary of those amines which can be utilized are alkylene polyamines such as diethylene triamine, triethylene tetramine and the like, oxyalkylene polyamines such as polyoxypropylene, di- and triamine and 1,13-diamino 4,7,10-trioxatridecane.

Additionally, aromatic amine curing agents are useful, such as the alkylene-linked polyphenyl amines, phenylene diamines and polycyclic or fused aromatic primary amine compounds. Additionally the corresponding cycloaliphatic compounds can be used.

Likewise, the polyamide curing agents such as the condensation products of polyamines and polycarboxylic acids are useful. Suitable such amide compounds are, for example, the condensation product of a polyamine and a dimerized fatty acid produced in accordance with U.S. Pat. No. 2,379,413.

Of the amine curing agents known to be effective in curing a vicinal epoxy resin, preferred curing agents in accordance with the instant invention are the polyoxyalkylene containing amine compounds. A preferred class of polyoxyalkylene polyamines is depicted by the formula:

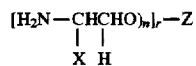

wherein X is hydrogen, a methyl radical or an ethyl radical; Z is a hydrocarbon radical having 2 to 5 carbon atoms forming from 2 to 4 external ether linkages; n is a number from 1 to about 15 and r is a number from 2 to 4. The most preferred polyoxyalkylene polyamines are the polyoxypropylene diamines wherein X is a methyl radical, n is a number from 1 to 10, Z is a 1,2-propylene radical and r is about 2. These polyoxyalkylene polyamines can be prepared by known methods as disclosed in U.S. Pat. Nos. 3,236,895 and 3,654,370. The most preferred polyoxyalkylene polyamine is a polyoxypropylene diamine having a molecular weight of about 230.

Another preferred class of polyoxyalkylene polyamines can be depicted by the formula:

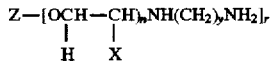

wherein X, Z, n and r are defined above and y is 2 or 3. These poly(aminoalkylamino)polyethers are the hydrogenerated product of the cyanoalkylated adduct of a polyoxyalkylene polyamine as described. The preparation of the cyanoalkylated adducts is described in U.S. Pat. No. 3,666,788 to Rowton.

Examples of preferred alkanolamines useful in the invention include mono-, di- and triethanolamine, hydroxy ethoxyethylamine, N-aminoethylethanolamine, N,N-bis (hydroxypropyl), N-hydroxyethylamine, and the like. Triethanolamine is especially preferred.

The monohydric or dihydric polyether polycarbonate materials of the instant invention are prepared by catalytically reacting, at autogenous pressure an initiator compound having one or two reactive hydroxyl or carboxyl groups attached to an alkyl or alkylphenyl group, or an alkylene oxide adduct thereof, with an alkylene oxide and carbon dioxide or an alkylene carbonate.

Thus formed, the compounds of this invention consist of:

(a) an initiator compound segment derived from an initiator having one or two reactive hydroxyl or carboxyl group attached to an alkyl or alkylphenyl group, or an alkylene oxide adduct thereof; and (b) an alkoxycarbonyl chain segment of groups attached to the initiator compound at the site of each hydroxyl or carboxyl group by the reaction of an alkylene carbonate having from 2 to 6 carbon atoms, or a mixture of an alkylene oxide, having 2 to 5 carbon atoms, and carbon dioxide at the ratio of from 1 to 10 moles of the alkylene oxide per mole of carbon dioxide, wherein there is present an average of from 1 to 30 carbonyl groups in the alkoxycarbonyl chain segment per mole of initiator compound.

Essential to the production of the polyether polycarbonate materials of this invention is the use of a monofunctional initiator in an amount such that the mole ratio of alkylene oxide and carbon dioxide to the monofunctional initiator is from about 2 to about 30. Suitable monofunctional initiators are alcohols, alkylene oxide adducts of alcohols, alkyl phenols, alkylene oxide adducts of alkyl phenols or mono carboxylic acids. The preferred initiator compounds are alcohols having from about 6 to about 22 carbon atoms and, more particularly secondary alcohols having from about 11 to about 15 carbon atoms; 1 to about 8 mole alkylene oxide, particularly ethylene oxide or propylene oxide, adduct of an alcohol having from 1 to about 8 carbon atoms and, more particularly, the 3 mole ethylene oxide adduct of an alcohol having from 12 to 13 carbon atoms and a 7 mole propylene oxide adduct of n-butanol; alkyl phenols wherein the alkyl moiety has from about 4 to about 16 carbon atoms and, more particularly, nonylphenol; 1 to about 15 moles alkylene oxide, particularly ethylene oxide or propylene oxide, adduct of an alkyl phenol having an alkyl moiety from about 4 to about 15 carbons, and more particularly, the 6 to 12 moles ethylene oxide adduct of nonylphenol; and a monocarboxylic acid having from about 4 to about 22 carbon atoms and, more particularly, oleic acid.

The chain segment of alkoxycarbonyl groups attached to the initiator compound at the site of each hydroxyl or carboxyl group is formed by reaction of an alkylene carbonate or a mixture of alkylene oxide and carbon dioxide with the initiator compound. Suitable alkylene carbonates are those having from 2 to 6 carbon atoms with ethylene carbonate or propylene carbonate being preferred. Alkylene oxide and carbon dioxide reaction products are present in the alkoxycarbonyl chain segment at a ratio of from 1 to 10 moles alkylene oxide per mole of carbon dioxide and the chain segment contains an average of from 1 to about 30 carbonyl groups per mole of the initiator compound.

In preparing the compounds of this invention, a wide variety of catalysts may be employed in the reaction of the instant invention. Among the well-known catalysts which have been found to be useful are alkali carbonates such as sodium, potassium, calcium and magnesium carbonate; alkali hydroxides such as sodium hydroxide, potassium hydroxide and calcium hydroxide; alkali carbonates such as potassium bicarbonate; tertiary amines such as n-alkyl morpholines; and other inorganic or organic base catalyst such as are illustrated in U.S. Pat. No. 3,248,415. It is also possible to employ an alkali metal stannate, alkaline earth metal stannate or ammonium stannate. Exemplary of suitable stannate catalyst are sodium stannate trihydrate, potassium stannate trihydrate, potassium stannate monohydrate, barium stannate trihydrate and magnesium stannate trihydrate, and other like catalysts as discussed in U.S. Pat. Nos. 3,689,462 and 3,896,090. The disclosure of the above patents are incorporated herein by reference as illustrative of the use of the known catalyst for the polyether polycarbonate reaction.

The preferred catalyst is potassium stannate as used in the amounts as disclosed by the above U.S. Pat. No. 3,689,462. The disclosure of the foregoing patents are incorporated herein by reference for the catalysts and reaction conditions stated therein.

An alkylene oxide and carbon dioxide are charged to a reaction vessel designed to withstand elevated pressures in a mole ratio of from about 1 to about 10. An initiator compound is charged in an amount such that the mole ratio of carbon dioxide to the initiator compound is from about 2 to about 30 such that the above-mentioned ratio of carbonyl groups in the ethoxycarbonyl chain segment will be attained. An effective amount of the chosen catalyst is included. With the reaction vessel sealed the temperature is raised above 100° C. and autogenous pressure is developed. Under these conditions a monohydric ethoxycarbonyl chain segment is attached to the site of the hydroxyl or carboxyl group. The reaction is allowed to proceed to completion as indicated by the attainment of an equilibrium pressure in the reaction vessel. Upon completion, an aliphatic polyether monohydric polyether carbonate material of this invention is recovered. Usually the method of recovery involves stripping the reaction mixture, which may, but need not, be neutralized with a magnesium silicate prior to stripping, to 150° C. at about 2 mm Hg and filtering, preferably with a filter aid such as Hyflo Supercel.

The reaction temperature is maintained above 100° C. and more particularly at a temperature in excess of 150° C. and less than about 200° C., or at the temperature at which there is a tendency for substantial rupture or decomposition of the polyether polycarbonate material to occur. When an alkylene oxide adduct of an alcohol or an alkyl phenol is used it is preferred to conduct the reaction between about 150° C. to about 200° C. in order to suppress possible initiator decomposition that may result in formation of difunctional materials in the reaction mixture. During the course of the reaction, the autogenous pressure has been found to rise to a maximum of from about 500 to about 1550 psig. As the reaction goes to completion the pressure decreases as the carbon dioxide is reacted with the alkylene oxide. The final equilibrium pressure upon completion of the reaction ranges from about 20 psig (239 kPa) to about 100 psig (790 kPa). The pressure of the reaction depends upon the volume of the reactor, the temperature of the reactants and the number of moles of alkylene oxide and carbon dioxide charged. Although it is not essential, it is preferred to conduct the reaction so that the maximum pressure is from about 500 psig (3548 kPa) to about 1550 psig (10,788 kPa). Although it is not essential, it is generally preferred to allow the reaction to proceed to completion as indicated by attainment of final equilibrium pressure in the reactor. The time to reach completion varies depending upon the types and amounts of materials charged and the reaction temperature but generally ranges from about 3 to about 9 hours.

Suitable alkylene oxides include epoxides such as ethylene oxide, propylene oxide, 1,2-butylene oxide or the like olefinically saturated aliphatic epoxides that have up to carbons. Although it is not essential, the preferred alkylene oxides are ethylene oxide and propylene oxide.

Controlling the mole ratio of the alkylene oxide and carbon dioxide to the initiator is essential to the production of the materials of this invention in order that the ratio of carbonyl groups in the alkoxycarboxyl claim segment to the initiator compound is as set forth hereinbefore. This ratio may be varied from 1 to about 30. Preferred ratios depend upon the initiator used as follows: for alcohols a ratio of from about 5 to about 15; for alkylene oxide adducts of alcohols a ratio from about 10 to about 30; for alkyl phenols a ratio of from about 5 to about 20; for alkylene oxide adducts of alkyl phenols a ratio from about 5 to about 15; and for monocarboxylic acids a ratio from about 15 to about 25 are preferred.

Controlling the mole ratio of the alkylene oxide to carbon dioxide is also essential to the production of the materials of this invention. Generally, this ratio ranges from about 1 to about 10. The preferred alkylene oxide to carbon dioxide ratios depend upon the monohydric initiator used as follows; for example, for alcohols the ratio is from about 2 to about 4; for alkylene oxide adducts of alcohols the ratio is from about 2 to about 6; for alkyl phenols the ratio is from about 2 to about 4; for alkylene oxide adducts of alkyl phenols the ratio is from about 1 to about 4; and for monocarboxylic acids the ratio is from about 4 to about 8.

If an alkylene carbonate is employed as the source of carbon dioxide and alkylene oxide then the general reaction process is somewhat different. The alkylene carbonate and the monohydric initiator are charged to a reaction vessel in a mole ratio of from about 1 to about 10. An effective amount of catalyst, such as potassium stannate, for example, is included. The reaction vessel is fitted with a back pressure regulator which is set to about 100 psig (790 kPa). The reaction vessel, after being purged with prepurified nitrogen, is heated to a temperature above 100° C., about 180° C. is preferred, at which point carbon dioxide evolution begins. The reaction vessel is maintained at about 100° C. to about 185° C. until carbon dioxide evolution ceases at which time the reaction mixture is allowed to cool and the polyether carbonate material is recovered.

Essential to the performance of the invention by this process is the mole ratio of alkylene carbonate to monohydric initiator. A general range of from about 1 to about 30 may be employed with the range of from about 1 to about 10 being preferred to provide the alkoxy-carbonate chain segment as previously described.

The curing agent mixture is usually added to the epoxy base resin in such an amount that there is one reactive NH group in the curing component for each epoxy group in the epoxy resin component. These are known as stoichiometric quantities. The stoichiometric quantity can be calculated from the knowledge of the chemical structure and analytical data on the component.

For the purposes of the present invention, the stoichiometric amount of curing agent mixture is calculated by adding together the number of equivalents on the basis of wt % replaceable NH groups.

Stoichiometry unfortunately is not always calculable. The proper amount of curative to provide best properties is usually determined by the preparation of a number of samples which are tested to determine the composition with the most desirable physical characteristics. Typically, the physical property maximized is either the glass transition point (Tg) according to ASTM D-3418 or the heat deflection temperature (HDT) according to ASTM D-648.

This invention is shown by way of Example.

EXAMPLE 1

Preparation of a nonylphenol based polycarbonate by the potassium stannate-catalyzed reaction of nonylphenol (NP) with ethylene oxide and carbon dioxide.

The reaction was carried out using a one gallon (3.8 liter) stirred autoclave followed by a 1.145 liter tubular reactor. A NP/potassium stannate initiator was first prepared as follows: 30 pounds (13.6 kg), of NP was mixed with 210 grams potassium stannate at 50° C. and then stirred at 100° C. for one hour and filtered. The filtered product contained 1600 ppm potassium.

The NP/potassium stannate, ethylene oxide (EO) and carbon dioxide were then fed separately into the stirred autoclave under the following conditions:

TABLE 1

| Feed | Run No. 6648-80 Feed Rate, lb/hr |
|---|---|
| NP/potassium stannate | 0.24 lb/hr (108.8 gram/hr) |
| EO | 0.72 lb/hr (326.6 gram/hr) |
| $CO_2$ | 0.194 lb/hr (88.0 gram/hr) |
| Reaction Parameters | |
| One gallon (3.8 liter) reactor | 172–176° C. |
| Tubular reactor | 154–176° C. |
| Pressure | 600 psig (4238 kPa) |
| Holding time | 7.2 hr |
| Length of run | 7.0 hr |

The effluent from the tubular reactor was then neutralized by stirring with Magnesol 30/40 magnesium silicate, stripped and filtered. Properties of the finished monononylphenol polycarbonate (MNP polycarbonate) product were as follows:

TABLE 2

| Properties | Sample No. 6648-80 |
|---|---|
| Hydroxyl No., mg KOH/gram | 128 |
| Water, wt % | 0.03 |
| pH in 10:6 isopropanol-water | 7.4 |
| Sodium, ppm | 5.0 |
| Potassium, ppm | 2.0 |
| Tin, ppm | 10 |
| Saponification no., mg KOH/gram | 107.5 |
| Carbon dioxide content, wt % | 8.4 |
| Viscosity, | |
| 77° F. (25° C.) | 403 cs (0.4 Pas) |
| 100° F. (37.7° C.) | 173 cs (0.17 Pas) |

EXAMPLES 2 AND 3

Preparation of a polycarbonate diol by reaction of an ethylene glycol (EG)/phthalic anhydride initiator with EO and carbon dioxide in the presence of potassium stannate catalyst.

The reactor described in Example 1 was used for this Example 2. The EG/phthalic anhydride initiator was synthesized as follows: EG (6214 grams) and potassium stannate (103.5 grams) were charged to a five gallon (18.9 liter) kettle which was then purged with prepurified nitrogen. The EG/potassium stannate was then heated one hour at 100° C. Phthalic anhydride (7394 grams) was then charged to the reactor and stirred 2 hours at 125° C. It was then cooled to 50° C. and drained from the kettle. The finished product was a clear, viscous liquid.

The EG/phthalic anhydride initiator, EG and carbon dioxide were then reacted under the following conditions:

TABLE 3

| Feed | Run No. 6648-62 Feed Rate | Run No. 6648-59 Feed Rate |
|---|---|---|
| EG/phthalic anhydride initiator | 0.5 lb/hr (226.8 gram/hr) | 0.99 lb/hr (4491.1 gram/hr) |
| EO | 2.55 lb/hr (1156.7 gram/hr) | 2.55 lb/hr (1156.7 gram/hr) |
| $CO_2$ | 0.636 lb/hr (288.5 gram/hr) | 0.64 lb/hr (290.3 gram/hr) |
| Reaction Parameters | | |
| One gallon (3.8 liter) reactor | 169–175° C. | 175–176° C. |
| Tubular reactor | 139–180° C. | 154–175° C. |
| Pressure | 600 psig (4238 kPa) | 600 psig (4238 kPa) |
| Holding time | 2.2 hr | 2.0 hr |
| Length of run | 5.5 hr | — |

The crude product was then neutralized by stirring with Magnesol 30/40 magnesium silicate stripped, and filtered. Properties of the finished product were as follows:

TABLE 4

| Properties | Sample No. 6648-62 | Sample No. 6648-59 |
|---|---|---|
| Acid No. mg KOH/g | 0.012 | 0.15 |
| Hydroxyl No., mg KOH/g | 211.4 | 272 |
| pH in 10:6 isopropanol-water | 6.7 | 6.8 |
| potassium, ppm | 21.2 | 77 |
| Tin, ppm | 10.0 | 1.0 |
| Viscosity, 77° F. (25° C.) | 1869 cs (1.9 Pas) | 952 cs (0.95 Pas) |
| Saponification No., mg KOH/g | 258.2 | 238.6 |
| Carbon dioxide content, wt % | 20.2 | 18.7 |

EXAMPLE 4

This example will show the use of the monononylphenol (MNP) based polyalkylene polycarbonate as an additive in the cure of liquid epoxy resins. It will further show that liquid epoxy resin formulations cured with this polycarbonate material were harder and had improved tensile modulus, flexural strength, and flexural modulus. Other properties were satisfactory.

Formulations and cured epoxy resin properties are shown in Table 5:

TABLE 5

| Formulation, parts by weight (pbw) | | | | |
|---|---|---|---|---|
| Liquid epoxy resin (EEW 188) | 90 | 100 | 90 | 100 |
| MNP Polycarbonate of Example 1 (6648-80) | 10 | — | 10 | — |
| JEFFAMINE ® D-230 | 28.7 | 32 | — | — |
| JEFFAMINE ® EDR-148 | — | — | 17.7 | 20 |
| Properties of Cured ⅛-inch (0.3 cm) Castings Cured 2 hrs 80° C., 3 hrs 125° C. | | | | |
| Shore D hardness, 0–10 sec | 86–83 | 78–75 | 82–81 | 81–79 |
| HDT, °C., 264 psi (1820 kPa) load | 58 | 80 | 54 | 87 |
| Izod impact strength, ft-lb/in | 0.97 | 1.28 | 1.20 | 1.7 |
| Tensile strength, psi | 9100 | 9400 | 9100 | 8900 |
| Tensile modulus, psi | 460000 | 392000 | 440000 | 361500 |
| Ultimate elongation, % | 3.6 | 8 | 4.5 | 11.0 |
| Flexural strength, psi | 16000 | 14900 | 16200 | 12600 |
| Flexural modulus, psi | 455700 | 429000 | 439000 | 343000 |
| % Wt gain, 24-hr water boil | 2.7 | 2.4 | 3.9 | 3.2 |

TABLE 5-continued

| Compression strength, psi | | | | |
|---|---|---|---|---|
| at yield | 12900 | — | 12800 | 10600 |
| at failure | 25900 | 46700 | 20000 | 46000 |
| Adhesion Properties Cured 1 hr 125° C. | | | | |
| Tensile shear strength, psi | 3900 | 4000 | 4200 | 3100 |
| T-peel strength, pli | 2.6 | 2.0 | 1.7 | 1.3 |

EEW — equivalent epoxy weight
JEFFAMINE ® D-230 (Texaco Chemical Co.)
$H_2NCH(CH_3)CH_2$—$[OCH_2CH(CH_3)]_xNH_2$
wherein: x averages 2.6
JEFFAMINE ® EDR-148 (Texaco Chemical Co.)
$H_2NCH_2CH_2OCH_2CH_2OCH_2CH_2NH_2$

EXAMPLE 5

This example shows the use of the polyoxyalkylene polycarbonate resin in liquid epoxy resin formulations cured with JEFFAMINE® EDR-148. It also shows the improved properties of the cured resin compared to those cured with JEFFAMINE® EDR-148 alone.

Formulations and properties are shown in Table 6:

TABLE 6

Evaluation of Experimental Carbonates in an Epoxy Formulation Cured with JEFFAMINE ® EDR-148

| Formulation, pbw | | | | |
|---|---|---|---|---|
| Liquid epoxy resin (EEW 188) | 90 | 100 | 100 | 100 |
| MNP Polycarbonate (6648-80) | 10 | — | — | — |
| Polycarbonate (6648-59) | — | 10 | — | — |
| Polycarbonate (6648-62) | — | — | 10 | — |
| JEFFAMINE ® EDR-148 | 17.7 | 20 | 20 | 20 |
| Properties of Cured ⅛-inch (0.3 cm) Castings cured 2 hrs 80° C., 3 hrs 125° C. | | | | |
| Shore D hardness, 0–10 sec | 82–81 | 85–83 | 84–82 | 81–79 |
| HDT, °C., 264 psi (1820 kPa) load | 54 | 62 | 63 | 87 |
| Izod impact strength, ft-lb/in | 1.20 | 1.24 | 1.43 | 1.7 |
| Tensile strength, psi | 9100 | 10200 | 10000 | 8900 |
| Tensile modulus, psi | 440000 | 490000 | 460000 | 361500 |
| Ultimate elongation, % | 4.5 | 7.1 | 5.2 | 11.0 |
| Flexural strength, psi | 16200 | 17600 | 18100 | 12600 |
| Flexural modulus, psi | 439000 | 442000 | 443000 | 343000 |
| % Wt gain, | | | | |
| 24-hr water boil | 3.9 | 3.8 | 3.9 | 3.2 |
| 3-hr acetone boil | — | 4.6 | 4.7 | 2.4 |
| Compression strength, psi | | | | |
| at yield | 12800 | 13800 | — | 10600 |
| at failure | 20000 | 30000 | — | 46000 |
| Adhesion Properties cured 1 hr 125° C. | | | | |
| Tensile shear strength, psi | 4200 | 4100 | 4000 | 3100 |
| T-peel strength, pli | 1.7 | 2.2 | 2.4 | 1.3 |

EXAMPLE 6

This example shows the use of the polyoxyalkylene polycarbonate resin in liquid epoxy resin systems cured at ambient temperatures with diethylene triamine (DETA).

The polyoxyalkylene polycarbonate resins provides improvement in tensile, flexural and compression strength of epoxy systems cured at ambient temperatures with DETA.

Formulations and properties are shown in Table 7:

TABLE 7

Cured Epoxy Properties Obtained with DETA/Polycarbonate Blends (Ambient Temperature Cure)

| | A | B | C | D |
|---|---|---|---|---|
| Formulation, pbw (6812-96) | | | | |
| Liquid epoxy resin (EEW 188) | 100 | 100 | 100 | 100 |
| Diethylenetriamine (DETA) | 11 | 11 | 11 | 11 |
| Example 1 Polycarbonate (6648-80) | — | 10 | — | — |
| Example 3 Polycarbonate (6648-59) | — | — | 10 | — |
| Example 2 Polycarbonate (6648-62) | — | — | — | 10 |
| Properties of Cured ⅛-inch (0.3 cm) Castings cured 7 days 23° C. | | | | |
| Shore D hardness, 0–10 sec | 86–85 | 85–83 | 84–82 | 86–84 |
| HDT, °C., 264 psi (1820 kPa) load | 51 | 46 | 49 | 49 |
| Izod impact strength, ft-lb/in | — | 0.25 | 0.46 | 0.24 |
| Tensile strength, psi | 1300 | 9000 | 8100 | 9100 |
| Tensile modulus, psi | 564000 | 540000 | 560000 | 580000 |
| Elongation at break, % | 0.2 | 1.9 | 1.8 | 2.3 |
| Flexural strength, psi | 2400 | 18900 | 19000 | 18000 |
| Flexural modulus, psi | 500000 | 530000 | 542000 | 535000 |
| % Wt gain, | | | | |
| 24-hr water boil | — | 3.5 | 3.7 | 3.6 |
| 3-hr acetone boil | — | 11.6 | 8.8 | 10.0 |
| Compression strength, psi | | | | |
| at yield | — | 15000 | 16400 | 16000 |
| at failure | 7500 | 21000 | 25000 | 25000 |

EXAMPLE 7

This example shows the use of the polyoxyalkylene polycarbonate resin in epoxy formulations cured with DETA at elevated temperatures.

These polycarbonates provide improvement in the tensile and flexural strength properties of these formulations over those of the unmodified formulation.

Formulation and properties are shown in Table 8:

TABLE 8

Cured Epoxy Properties Obtained with DETA/Polycarbonate Blends (High Temperature Cure)

| | A | B | C | D |
|---|---|---|---|---|
| Formulation, pbw (6812-95) | | | | |
| Liquid epoxy resin (EEW 188) | 100 | 100 | 100 | 100 |
| Diethylenetriamine (DETA) | 11 | 11 | 11 | 11 |
| Example 1 Polycarbonate (6648-80) | — | 10 | — | — |
| Example 3 Polycarbonate (6648-59) | — | — | 10 | — |
| Example 2 Polycarbonate (6648-62) | — | — | — | 10 |
| Properties af Cured ⅛-inch (0.3 cm) Castings cured 2 hours 80° C., 3 hours 125° C. | | | | |
| Shore D hardness, 0–10 sec | 89–87 | 83–82 | 88–87 | 87–86 |
| HDT, °C., 264 psi (1820 kPa) load | 129 | 87 | 88 | 93 |
| Izod impact strength, ft-lb/in | 0.42 | 0.21 | 0.27 | 0.26 |
| Tensile strength, psi | 8100 | 9900 | 8400 | 9900 |
| Tensile modulus, psi | 410000 | 537000 | 525000 | 560000 |

TABLE 8-continued

Cured Epoxy Properties Obtained with DETA/Polycarbonate Blends (High Temperature Cure)

|  | A | B | C | D |
|---|---|---|---|---|
| Elongation at break, % | 3.3 | 2.7 | 2.0 | 2.6 |
| Flexural strength, psi | 12800 | 20100 | 17000 | 18000 |
| Flexural modulus, psi | 370000 | 478000 | 478000 | 480000 |
| % wt gain, | | | | |
| 24-hr water boil | — | 4.1 | 3.8 | 4.1 |
| 3-hr acetone boil | — | 1.9 | 1.3 | 1.1 |
| Compression strength, psi | | | | |
| at yield | — | 23000 | 16400 | 16400 |
| at failure | 27000 | 33000 | 36000 | 35000 |
| Adhesion Properties cured 1 hour 125° C. | | | | |
| Tensile shear strength, psi | 2400 | * | 1700 | 2100 |
| T-peel strength, pli | 2.3 | | 0.9 | 0.9 |

*Apparent incompatibility in system. Excessive beading on aluminum panels.

EXAMPLE 9

This example shows the use of polyoxyalkylene polycarbonate/JEFFAMINE® EDR-148 diamine combination in the cure of liquid epoxy resin.

Improvements in some strength properties were observed.

Formulation and properties are shown in Table 9:

TABLE 9

Evaluation of Experimental Carbonates in an Epoxy Formulation Cured with JEFFAMINE ® D-230

| Formulation, pbw | | | | |
|---|---|---|---|---|
| Liquid epoxy resin (EEW 188) | 90 | 100 | 100 | 100 |
| MNP Polycarbonate (6648-80) | 10 | — | — | — |
| Polycarbonate (6648-59) | — | 10 | — | — |
| Polycarbonate (6648-62) | — | — | 10 | — |
| JEFFAMINE ® D-230 | 28.7 | 32 | 32 | 32 |
| Properties of Cured ⅛-inch (0.3 cm) Castings cured 2 hrs 80° C., 3 hrs 125° C. | | | | |
| Shore D hardness, 0–10 sec | 86–83 | 82–80 | 83–82 | 78–75 |
| HDT, °C., 264 psi (1820 kPa) load | 58 | 56 | 58 | 80 |
| Izod impact strength, ft-lb/in | 0.97 | 0.73 | 1.03 | 1.28 |
| Tensile strength, psi | 9100 | 9900 | 9700 | 9400 |
| Tensile modulus, psi | 460000 | 500000 | 500000 | 392000 |
| Ultimate elongation, % | 3.6 | 5.5 | 4.7 | 8 |
| Flexural strength, psi | 16000 | 17200 | 17100 | 14900 |
| Flexural modulus, psi | 455700 | 461000 | 450000 | 429000 |
| % Wt gain, | | | | |
| 24-hr water boil | 2.7 | 2.9 | 3.2 | 2.4 |
| 3-hr acetone boil | — | 9.0 | 8.7 | 6.9 |
| Compression strength, psi | | | | |
| at yield | 12900 | 13400 | 12900 | — |
| at failure | 25900 | 26000 | 32000 | 46700 |
| Adhesion Properties cured 1 hr 125° C. | | | | |
| Tensile shear strength, psi | 3900 | 1800 | 3000 | 4000 |
| T-peel strength, pli | 2.6 | 2.4 | 2.8 | 2.0 |

TABLE OF TEST METHODS

| | |
|---|---|
| Gel Time (minutes) | ASTM D-2471-71 |
| Elongation (%) | ASTM D-638 |
| Tensile Strength (psi) (kpa) | ASTM D-638 |
| Tensile Modulus (psi) (MPa) | ASTM D-638 |
| Flexural Strength (kPa) | ASTM D-790 |
| Flexural Modulus (psi) (MPa) | ASTM D-790 |
| Heat Deflection Temperature (HDT) (°C., 264 psi/66 psi) (°C., 1820 kPa/455 kPa) | ASTM D-648 |
| Glass Transition Point (Tg) (°C.) | ASTM D-3418 |
| Shore D-Hardness (0–10 seconds) | ASTM D-2240 |
| Izod Impact Strength (ft. lb/in) | ASTM D-256 |
| Compression Strength (psi) | ASTM D-695 |
| T-peel Strength (pli) | ASTM D-1876 |
| Tensile Shear Strength (psi) | ASTM D-1002 |

While particular embodiments of the invention have been described, it will be understood, of course, that the invention is not limited thereto since many modifications may be made, and it is, therefore, contemplated to cover by the appended claims any such modification as fall within the true spirit and scope of the invention.

What is claimed is:

1. An epoxy resin composition comprising the cured reaction product of an epoxy resin and a curing agent, the curing agent comprising a mixture of an amino curative and a polyoxyalkylene polycarbonate, said polyoxyalkylene polycarbonate consisting of:

(a) an initiator moiety having one or two reactive hydroxyl or carboxyl groups chemically bonded to a hydrocarbon radical selected from the group consisting of alkyl, alkylphenyl and oxyalkylene;

(b) an oxyalkylenecarbonyl moiety chemically bonded to the initiator moiety at the site of the hydroxyl or carboxyl groups by the reaction of an alkylene carbonate having from 2 to 6 carbon atoms or a mixture of an alkylene oxide, having 2 to 5 carbon atoms and carbon dioxide in the ratio of from 1 to 10 moles of the alkylene oxide per mole of carbon dioxide; wherein there is present an average of from 1 to 30 carbonyl groups in the oxyalkylenecarbonyl moiety per mole of initiator moiety.

2. The epoxy resin composition of claim 1 wherein in the initiator moiety the hydrocarbon radical is an alkyl of from 2 to 22 carbon atoms.

3. The epoxy resin composition of claim 1 wherein the initiator moiety is an alkylene glycol having from 2 to 22 carbon atoms.

4. The epoxy resin composition of claim 1 wherein the initiator moiety is an alkylphenol having from 6 to 22 carbon atoms.

5. The epoxy resin composition of claim 1 wherein the initiator moiety is an aliphatic alcohol having from 2 to 22 carbon atoms.

* * * * *